(12) United States Patent
Seo

(10) Patent No.: US 9,053,177 B1
(45) Date of Patent: Jun. 9, 2015

(54) SITELINKS BASED ON VISUAL LOCATION

(75) Inventor: Minkoo Seo, GunPoSI (KR)

(73) Assignee: Google Inc., Mountain View, CA (US)

( * ) Notice: Subject to any disclaimer, the term of this patent is extended or adjusted under 35 U.S.C. 154(b) by 411 days.

(21) Appl. No.: 13/493,096

(22) Filed: Jun. 11, 2012

(51) Int. Cl.
*G06F 17/00* (2006.01)
*G06F 17/30* (2006.01)
*G06F 3/048* (2013.01)

(52) U.S. Cl.
CPC .... *G06F 17/30696* (2013.01); *G06F 17/30882* (2013.01)

(58) Field of Classification Search
CPC ............. G06F 17/30696; G06F 17/30882; G06F 3/0481
USPC .................................. 715/205, 206
See application file for complete search history.

(56) References Cited

U.S. PATENT DOCUMENTS

| | | | | |
|---|---|---|---|---|
| 7,024,629 | B2 * | 4/2006 | Alegria et al. | 715/739 |
| 7,464,326 | B2 * | 12/2008 | Kawai et al. | 715/205 |
| 7,565,409 | B2 * | 7/2009 | Heilbron et al. | 709/217 |
| 7,634,472 | B2 * | 12/2009 | Thrall | 1/1 |
| 7,702,678 | B2 * | 4/2010 | Teague | 707/722 |
| 7,716,225 | B1 * | 5/2010 | Dean et al. | 707/748 |
| 7,836,391 | B2 * | 11/2010 | Tong | 715/234 |
| 8,176,414 | B1 * | 5/2012 | Baluja | 715/238 |
| 2005/0071328 | A1 * | 3/2005 | Lawrence | 707/3 |
| 2006/0173817 | A1 * | 8/2006 | Chowdhury et al. | 707/3 |
| 2006/0287985 | A1 * | 12/2006 | Castro et al. | 707/3 |
| 2007/0208717 | A1 * | 9/2007 | Matsui | 707/3 |
| 2008/0033996 | A1 * | 2/2008 | Kesari | 707/104.1 |
| 2008/0101689 | A1 * | 5/2008 | Forman | 382/159 |
| 2009/0070413 | A1 * | 3/2009 | Priyadarshan et al. | 709/203 |
| 2010/0049762 | A1 * | 2/2010 | Cui et al. | 707/710 |
| 2011/0296290 | A1 * | 12/2011 | Ruthfield et al. | 715/206 |
| 2012/0096010 | A1 * | 4/2012 | Schwartz et al. | 707/748 |
| 2012/0290917 | A1 * | 11/2012 | Melnyk et al. | 715/234 |
| 2013/0254691 | A1 * | 9/2013 | Chen et al. | 715/767 |

OTHER PUBLICATIONS

All Links are Not Created Equal: 10 Illustrations—Moz, May 27, 2010, pp. 1-9 http://moz.com/blog/10-illustrations-on-search-engines-valuation-of-links.* computerhope.com, Jan. 13, 2012, pp. 1-3 http://www.computerhope.com/jargon/d/dom.htm.*

Google's Reasonable Surfer: How the Value of a Link May Differ Based upon Link and Document Features and User Data, May 11, 2010, pp. 1-8 http://www.seobythesea.com/2010/05/googles-reasonable-surfer-how-the-value-of-a-link-may-differ-based-upon-link-and-document-features-and-user-data/.*

* cited by examiner

*Primary Examiner* — Kyle Stork
*Assistant Examiner* — Mario M Velez-Lopez
(74) *Attorney, Agent, or Firm* — Harrity & Harrity, LLP

(57) ABSTRACT

A computing device may receive a request for sitelinks corresponding to a document and identify a plurality of hyperlinks corresponding to the document. Each hyperlink, of the plurality of hyperlinks, may include a hyperlink object within the document. The computing device may determine a visual location corresponding to each hyperlink of the plurality of hyperlinks corresponding to the document, and assign a score to each hyperlink, of the plurality of hyperlinks, based on the visual location corresponding to the hyperlink. The computing device may provide a sitelink, corresponding to a hyperlink, of the plurality of hyperlinks, based on the score assigned to the hyperlink.

26 Claims, 8 Drawing Sheets

SITELINKS BASED ON VISUAL LOCATION

BACKGROUND

Many techniques are available to users today to find information on the World Wide Web ("web"). For example, users often use web browsers and/or search engines to find information of interest. In order to provide quality results to users, search engines often provide links to websites corresponding to one or more search parameters.

SUMMARY

According to one possible implementation, a method may be performed by a computing device. The method may include receiving, by the computing device, a request for sitelinks corresponding to a document, and identifying, by the computing device, a plurality of hyperlinks corresponding to the document. Each hyperlink, of the plurality of hyperlinks, may include a hyperlink object within the document. The method may include determining, by the computing device, a visual location corresponding to each hyperlink of the plurality of hyperlinks corresponding to the document, and assigning, by the computing device, a score to each hyperlink, of the plurality of hyperlinks, based on the visual location corresponding to the hyperlink. The method may include selecting, by the computing device, a sitelink, corresponding to a hyperlink of the plurality of hyperlinks, based on the score assigned to the hyperlink, and providing, by the computing device, a search result that includes the sitelink.

When identifying the plurality of hyperlinks corresponding to the document, the method may include identifying the document based on the request, and parsing the document to identify hyperlinks within the document.

When determining the visual location corresponding to each hyperlink of the plurality of hyperlinks, the method may include: obtaining software code corresponding to the document: creating a document object model based on the software code, where the document object model may includes a hyperlink element corresponding to each hyperlink of the plurality of hyperlinks: and identifying the visual location corresponding to each hyperlink, of the plurality of hyperlinks, based on positions of the hyperlink elements within the document object model.

When identifying the visual location corresponding to each hyperlink, of the plurality of hyperlinks, based on positions of the hyperlink elements, the method may include determining at least one coordinate corresponding to each hyperlink, of the plurality of hyperlinks, within the document object model, and using the at least one coordinate to define the visual location.

When assigning a score to each hyperlink, of the plurality of hyperlinks, based on the visual location corresponding to the hyperlink, the method may include: defining two or more hyperlink groups based on the visual location corresponding to each hyperlink of the plurality of hyperlinks, where each hyperlink group of the two or more hyperlink groups may include at least one hyperlink of the plurality of hyperlinks; identifying a quantity of hyperlinks corresponding to each of the two or more hyperlinks groups; and assigning a score to each hyperlink group of the two or more hyperlink groups based on the quantity of hyperlinks corresponding to each of the two or more hyperlink groups.

Each hyperlink group, of the two or more hyperlink groups, may be defined based on a position of each hyperlink element within a document object model, and a parent element associated with each hyperlink element within the document object model.

When assigning, by the computing device, a score to each hyperlink, of the plurality of hyperlinks, based on the visual location corresponding to the hyperlink, the method may include assigning a score to each hyperlink corresponding to a hyperlink group, of the two or more hyperlink groups, corresponding to a highest score, and disregarding each hyperlink that does not correspond to the hyperlink group corresponding to the highest score.

When providing the search result, the method may include generating the search result corresponding to a search engine query, where the search result may include a hyperlink corresponding to the document, and the at least one sitelink.

The method may also assign a score to each hyperlink, of the plurality of hyperlinks based on a click-through rate corresponding to each hyperlink of the plurality of hyperlinks.

According to another possible implementation, a system may include a memory device to store instructions and one or more processors to execute the instructions. The processor may execute the instructions to receive a request for sitelinks corresponding to a document, and identify a plurality of hyperlinks corresponding to the document. Each hyperlink, of the plurality of hyperlinks, may include a hyperlink object within the document. The processor may execute the instructions to determine a visual location corresponding to each hyperlink of the plurality of hyperlinks corresponding to the document, and assign a score to each hyperlink of the plurality of hyperlinks based on the visual location corresponding to each hyperlink of the plurality of hyperlinks. The processor may execute the instructions to select at least one sitelink, corresponding to a hyperlink of the plurality of hyperlinks, based on the score assigned to the hyperlink, and provide a search result based on the at least one sitelink.

When identifying the one or more sitelinks corresponding to the document, the processor may identify the document based on the request, and parse the document to identify hyperlinks within the document.

When determining the visual location corresponding to each hyperlink, the processor may: obtain software code corresponding to the document; create a document object model based on the software code, where the document object model may include a hyperlink element corresponding to each hyperlink of the plurality of hyperlinks; and identify the visual location corresponding to each hyperlink, of the plurality of hyperlinks, based on a position of each hyperlink element within the document object model.

When defining the visual location of each hyperlink based on a position of each hyperlink element within the document object model, the processor may determine at least one coordinate corresponding to each hyperlink element within the document object model, and use the at least one coordinate to define the visual location.

When assigning a score to each hyperlink based on the visual location corresponding to each hyperlink, the processor may: define two or more hyperlink groups based on the visual location corresponding to each hyperlink of the plurality of hyperlinks, where each hyperlink group of the two or more hyperlink groups comprises at least one hyperlink of the plurality of hyperlinks; identify a quantity of hyperlinks corresponding to each of the two or more hyperlink groups; and score each hyperlink group, of the two or more hyperlink groups, based on the quantity of hyperlinks corresponding to each of the two or more hyperlink groups.

Each hyperlink group, of the two or more hyperlink groups, may be defined based on a position of each hyperlink within a document object model, and one or more parent element associated with each sitelink within the document object model.

When assigning a score to each hyperlink based on the visual location corresponding to each hyperlink, the processor may assign a score to each hyperlink corresponding to a hyperlink group, of the two or more hyperlink groups, corresponding to a highest score, and disregard each hyperlink that does not correspond to the hyperlink group corresponding to the highest score.

When providing the search result, the processor may generate the search result corresponding to a search engine query, where the search result may include a hyperlink corresponding to the document, and the at least one sitelink.

The processor may also assign a score to each hyperlink, of the plurality of hyperlinks, based on a click-through rate corresponding to each hyperlink of the plurality of hyperlinks.

According to another possible implementation, a computer-readable medium may include a set of instructions, which, when executed by a processor, cause the processors to receive a request for sitelinks corresponding to a document, and identify a plurality of hyperlinks corresponding to the document. Each hyperlink, of the plurality of hyperlinks, may include a hyperlink object within the document. The instructions may also cause the processor to produce a document object model associated with the document. The document object model comprises a hyperlink element corresponding to each hyperlink of the plurality of hyperlinks. The instructions may also cause the processor to identify a visual location corresponding to each hyperlink, of the plurality of hyperlinks, based on a position of each hyperlink element within the document object model, assign a score to each hyperlink, of the plurality of hyperlinks, based on the visual location corresponding to each hyperlink of the plurality of hyperlinks, and provide at least one sitelink, corresponding to a hyperlink of the plurality of hyperlinks, based on a score associated with the hyperlink.

When identifying the plurality of hyperlinks corresponding to the document, the set of instructions may cause the one or more processors to: identify the document based on the request; and parse the document to identify hyperlinks within the document.

When defining the visual location of each hyperlink based on a position of each hyperlink element within the document object model, the set of instructions may cause the one or more processors to: determine at least one coordinate corresponding to each hyperlink element within the document object model, and use the at least one coordinate to define the visual location.

When assigning a score to each hyperlink, the set of instructions may cause the one or more processors to: define two or more hyperlink groups based on the visual location corresponding to each hyperlink of the plurality of hyperlinks, where each hyperlink group of the two or more hyperlink groups comprises at least one hyperlink of the plurality of hyperlinks; identify a quantity of hyperlinks corresponding to each of the two or more hyperlink groups; and assign a score to each hyperlink group, of the two or more hyperlink groups, based on the quantity of hyperlinks corresponding to each of the two or more hyperlink groups.

Each hyperlink group, of the two or more hyperlink groups, may be defined based on a position of each hyperlink within a document object model, and one or more parent element associated with each hyperlink within the document object model.

When assigning a score to each hyperlink, the set of instructions may cause the one or more processors to: assign a score to each hyperlink corresponding to a hyperlink group, of the two or more hyperlink groups, corresponding to a highest score, and disregard each hyperlink that does not correspond to the hyperlink group corresponding to the highest score.

When providing the at least one sitelink, the set of instructions may cause the one or more processors to: generate a search result corresponding to a search engine query, where the search result may include a hyperlink corresponding to the document, and the at least one sitelink.

The set of instructions may also cause the one or more processors to assign a score to each hyperlink based on a click-through rate corresponding to each hyperlink of the plurality of hyperlinks.

DETAILED DESCRIPTION

The following detailed description refers to the accompanying drawings. The same reference numbers in different drawings may identify the same or similar elements.

A system or method, described herein, may be used to enhance search engine results by enabling search engine results to include scored sitelinks. For example, a sitelink management system may receive a request for sitelinks corresponding to a particular document (e.g., a web page). A sitelink, as described herein, may include a hyperlink within a search result document that is based on, or corresponds to, a hyperlink within a document. A sitelink may include a direct link to some part of the document, a direct link to some content of the document, etc. The sitelink management system may identify hyperlinks corresponding to the document, determine visual locations corresponding to the hyperlinks, and/or score the hyperlinks based on the visual locations. In one implementations, a visual location may include information describing a position of a hyperlink as represented by a document object model (DOM) corresponding to a document that includes the hyperlink, and/or information describing a position of the hyperlink when a document that includes the hyperlink is displayed within a web browser. The sitelink management system may also, or alternatively, provide sitelinks in accordance with the score of each hyperlink.

Since sitelinks may be included in a search engine result, scoring sitelinks according to visual locations and providing the sitelinks according to the score of each sitelink may enable the search engine result to not only include a hyperlink to a document, but also to include sitelinks corresponding to the most visually and/or functionally significant hyperlinks within the document. Accordingly, a system and/or method, as described herein, may be used to enhance search engine results corresponding to a document with one or more sitelinks to improve a user's search experience.

The concepts described herein may be applied to sets of documents. In one implementation, the documents may be images, such as images indexed by an image search engine. More generally, a document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information, such as meta information, images, hyperlinks, etc., and/or embedded instructions, such as JavaScript, etc. A "link" or "hyperlink," as the terms are used herein, are to be broadly interpreted to include any reference to/from a document from/to another document or another part of the same document.

Figure 1:
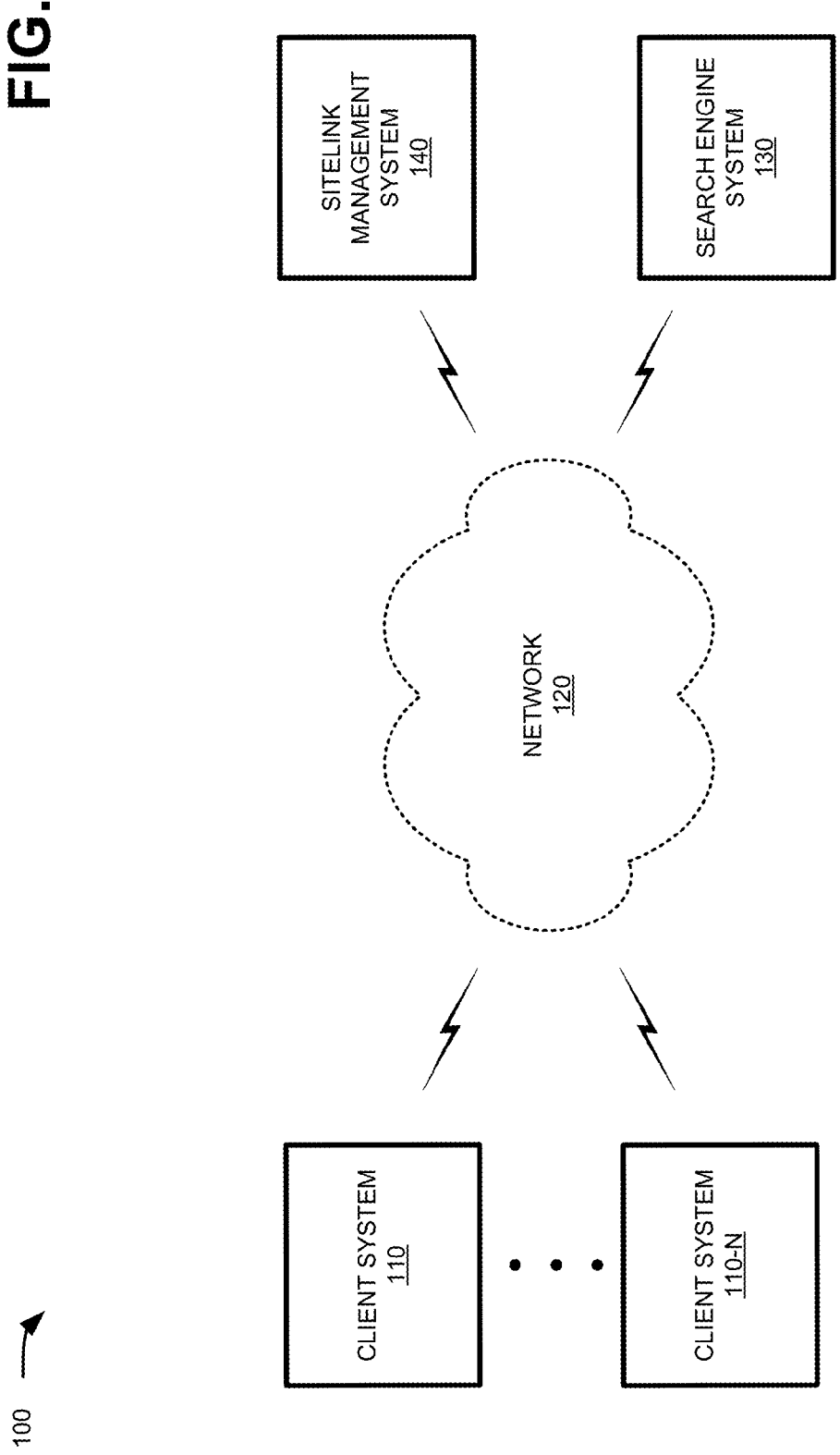
FIG. 1 is a diagram of an example environment in which systems and/or methods, described herein, may be implemented.

FIG. 1 is a diagram of an example environment 100 in which systems and/or methods described herein may be implemented. As depicted, environment 100 may include client systems 110-1, . . . , 110-N (where N≥1) (hereinafter referred to collectively as "client systems 110," and individually as "client system 110"), network 120, search engine system 130, and sitelink management system 140.

The number of systems and/or networks, illustrated in FIG. 1, is provided for explanatory purposes only. In practice, there may be additional systems and/or networks, fewer systems and/or networks, different systems and/or networks, or differently arranged systems and/or networks than illustrated in FIG. 1. For instance, in some implementations, search engine system 130 and sitelink management system 140 may correspond to the same system or device. In some implementations, sitelink management system 140 may operate behind search engine system 130. Sitelink management system 140 may be a separate system that pre-generates sitelinks and/or stores sitelinks in search engine system 130, in addition to serving sitelinks to search engine system 130.

Also, in some implementations, one or more of the systems of environment 100 may perform one or more functions described as being performed by another one or more of the systems of environment 100. For example, systems of environment 100 may interconnect via wired connections, wireless connections, or a combination of wired and wireless connections.

Client system 110 may include one or more types of computing and/or communication devices. For example, client system 110 may include a laptop computer, a desktop computer, a tablet computer, a mobile telephone (e.g., a smart phone), or one or more other types of computing and/or communication devices. Client system 110 may be capable of communicating with network 120. In one example, client system 110 may be capable of communicating a search engine query to search engine system 130 and/or receiving a search engine result from search engine system 130.

Network 120 may include any type of network and/or combination of networks. For example, network 120 may include a LAN (e.g., an Ethernet network), a wireless LAN (WLAN) (e.g., an 802.11 network), a wide area network (WAN) (e.g., the Internet), a wireless WAN (WWAN) (e.g., a 3gpp System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, a Worldwide Interoperability for Microwave Access (WiMAX) network, etc.). Additionally, or alternatively, network 120 may include a virtual network (e.g., a virtual private network (VPN)), a telephone network (e.g., a Public Switched Telephone Network (PSTN)), a cellular network, or another type of network.

Search engine system 130 may include one or more types of computing and/or communication devices. For example, search engine system 130 may include a desktop computer, a server, a cluster of servers, or one or more other types of computing and/or communication devices. Search engine system 130 may be capable of receiving a search engine query from client system 110, identifying a document based on query parameters included in the search engine query, and notifying sitelink management system 140 of the search engine query and/or the document. Search engine system 130 may receive one or more sitelinks, corresponding to the document, from sitelink management system 140, and may provide client system 110 with search engine results, such as a list of hyperlinks to documents and one or more of the sitelinks received from sitelink management system 140.

Sitelink management system 140 may include one or more types of computing and/or communication devices. For example, sitelink management system 140 may include a desktop computer, a server, a cluster of servers, or one or more other types of computing and/or communication devices. Sitelink management system 140 may be capable of receiving a request for sitelinks corresponding to a document and identifying one or more hyperlinks within the document. Sitelink management system 140 may also, or alternatively, determine a visual location of the hyperlinks and score the hyperlinks based on the visual locations. Additionally, or alternatively, sitelink management system 140 may provide sitelinks, corresponding to the hyperlinks, (e.g., to search engine system 130) according to the score of each hyperlink.

Figure 2:
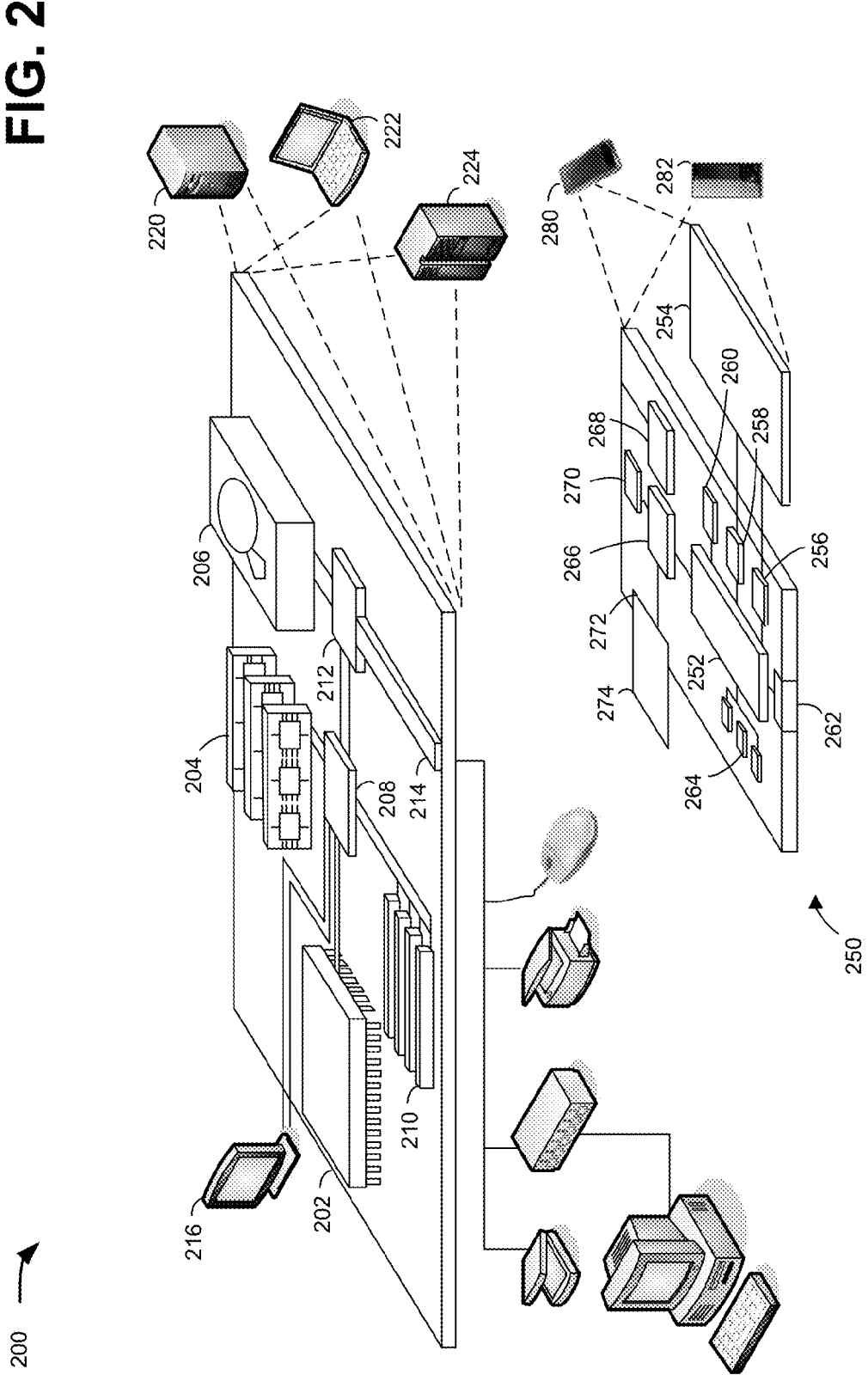
FIG. 2 is a diagram of an example of a device of FIG. 1.

FIG. 2 is a diagram of an example of a generic computing device 200 and a generic mobile computing device 250, which may be used with the techniques described here. Generic computing device 200 or generic mobile computing device 250 may correspond to, for example, client system 110, search engine system 130, and/or sitelink management system 140. Computing device 200 is intended to represent various forms of digital computers, such as laptops, desktops, workstations, personal digital assistants, servers, blade servers, mainframes, and other appropriate computers. Mobile computing device 250 is intended to represent various forms of mobile devices, such as personal digital assistants, cellular telephones, smart phones, tablet computers, and other similar computing devices. The components shown in FIG. 2, their connections and relationships, and their functions, are meant to be examples only, and are not meant to limit implementations described herein.

Computing device 200 may include a processor 202, a memory 204, a storage device 206, a high-speed interface 208 connecting to memory 204 and high-speed expansion ports 210, and a low-speed interface 212 connecting to a low-speed expansion port 214 and a storage device 206. Each of components 202, 204, 206, 208, 210, 212, and 214, are interconnected using various buses, and may be mounted on a common motherboard or in other manners as appropriate. Processor 202 can process instructions for execution within computing device 200, including instructions stored in memory 204 or on storage device 206 to display graphical information for a graphical user interface (GUI) on an external input/output device, such as display 216 coupled to high-speed interface 208. In other implementations, multiple processors and/or multiple buses may be used, as appropriate, along with multiple memories and types of memory. Also, multiple computing devices 200 may be connected, with each device providing portions of the necessary operations, as a server bank, a group of blade servers, or a multi-processor system, etc.

Memory 204 stores information within computing device 200. In one implementation, memory 204 includes a volatile memory unit or units. In another implementation, memory 204 may include a non-volatile memory unit or units. Memory 204 may also be another form of computer-readable medium, such as a magnetic or optical disk. A computer-readable medium may refer to a non-transitory memory device. A memory device may refer to storage space within a single storage device or spread across multiple storage devices.

Storage device 206 is capable of providing mass storage for computing device 200. In one implementation, storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 204, storage device 206, or a memory on processor 202.

High-speed interface 208 manages bandwidth-intensive operations for computing device 200, while low-speed interface 212 manages lower bandwidth-intensive operations. Such allocation of functions is exemplary only. In one implementation, high-speed interface 208 is coupled to memory 204, display 216 (e.g., through a graphics processor or accelerator), and to high-speed expansion ports 210, which may accept various expansion cards (not shown). In this implementation, low-speed interface 212 may be coupled to storage device 206 and low-speed expansion port 214. Low-speed expansion port 214, which may include various communication ports (e.g., USB, Bluetooth, Ethernet, wireless Ethernet, etc.), may be coupled to one or more input/output devices, such as a keyboard, a pointing device, a scanner, or a networking device such as a switch or router, e.g., through a network adapter.

Computing device 200 may be implemented in a number of different forms, as shown in the figure. For example, computing device 200 may be implemented as a standard server, or multiple times in a group of such servers. Computing device 200 may also be implemented as part of a rack server system 224. In addition, computing device 200 may be implemented in a personal computer, such as a laptop computer 222. Alternatively, components from computing device 200 may be combined with other components in a mobile device (not shown), such as mobile computing device 250. Each of such devices may contain one or more of computing devices 200, 250, and an entire system may be made up of multiple computing devices 200, 250 communicating with each other.

Mobile computing device 250 may include a processor 252, a memory 264, an input/output ("I/O") device, such as a display 254, a communication interface 266, and a transceiver 268, among other components. Mobile computing device 250 may also be provided with a storage device, such as a micro-drive or other device, to provide additional storage. Each of the components 252, 264, 254, 266, and 268 are interconnected using various buses, and several of the components may be mounted on a common motherboard or in other manners as appropriate.

Processor 252 can execute instructions within mobile computing device 250, including instructions stored in memory 264. Processor 252 may be implemented as a chipset of chips that include separate and multiple analog and digital processors. Processor 252 may provide, for example, for coordination of the other components of mobile computing device 250, such as control of user interfaces, applications run by mobile computing device 250, and wireless communication by mobile computing device 250.

Processor 252 may communicate with a user through control interface 258 and display interface 256 coupled to a display 254. Display 254 may be, for example, a TFT LCD (Thin-Film-Transistor Liquid Crystal Display) or an OLED (Organic Light Emitting Diode) display, or other appropriate display technology. Display interface 256 may include appropriate circuitry for driving display 254 to present graphical and other information to a user. Control interface 258 may receive commands from a user and convert the commands for submission to processor 252. In addition, an external interface 262 may be provided in communication with processor 252, so as to enable near area communication of mobile computing device 250 with other devices. External interface 262 may provide, for example, for wired communication in some implementations, or for wireless communication in other implementations, and multiple interfaces may also be used.

Memory 264 stores information within mobile computing device 250. Memory 264 can be implemented as one or more of a computer-readable medium or media, a volatile memory unit or units, or a non-volatile memory unit or units. Expansion memory 274 may also be provided and connected to mobile computing device 250 through expansion interface 272, which may include, for example, a SIMM (Single In Line Memory Module) card interface. Such expansion memory 274 may provide extra storage space for device 250, or may also store applications or other information for mobile computing device 250. Specifically, expansion memory 274 may include instructions to carry out or supplement the processes described herein, and may include secure information also. Thus, for example, expansion memory 274 may be provided as a security module for mobile computing device 250, and may be programmed with instructions that permit secure use of mobile computing device 250. In addition, secure applications may be provided via the SIMM cards, along with additional information, such as placing identifying information on the SIMM card in a non-hackable manner.

Expansion memory 274 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as memory 264, expansion memory 274, or a memory on processor 252, that may be received, for example, over transceiver 268 or external interface 262.

Mobile computing device 250 may communicate wirelessly through communication interface 266, which may include digital signal processing circuitry where necessary.

Communication interface 266 may provide for communications under various modes or protocols, such as GSM voice calls, Shot Messaging Service (SMS), Enhanced Messaging Service (EMS), or Multimedia Messaging Service (MMS), CDMA, Time Division Multiple Access (TDMA), Personal Digital Cellular (PDC), Wideband CDMA (WCDMA), CDMA2000, or General Packet Radio Service (GPRS), among others. Such communication may occur, for example, through transceiver 268. In addition, short-range communication may occur, such as using a Bluetooth, Wi-Fi, or other such transceiver (not shown). In addition, GPS (Global Positioning System) receiver module 270 may provide additional navigation- and location-related wireless data to mobile computing device 250, which may be used as appropriate by applications running on mobile computing device 250.

Mobile computing device 250 may also communicate audibly using audio codec 260, which may receive spoken information from a user and convert the received spoken information to digital information. Audio codec 260 may likewise generate audible sound for a user, such as through a speaker, e.g., in a handset of mobile computing device 250. Such sound may include sound from voice telephone calls, may include recorded sound (e.g., voice messages, music files, etc.), and may also include sound generated by applications operating on mobile computing device 250.

Mobile computing device 250 may be implemented in a number of different forms, as shown in the figure. For example, mobile computing device 250 may be implemented as a cellular telephone 280. Mobile computing device 250 may also be implemented as part of a smart phone 282, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a LAN, a WAN, and the Internet.

Figure 3:
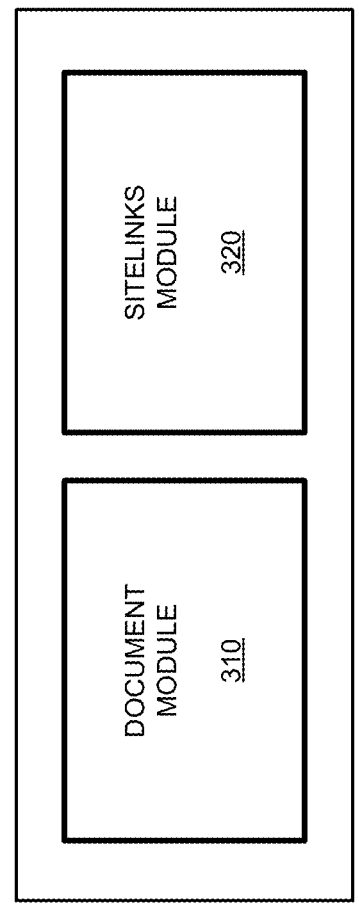
FIG. 3 a diagram of example functional components of a sitelink management system according to one or more implementations described herein.

FIG. 3 is a diagram of example functional components of sitelink management system 140 according to one or more implementations described herein. As depicted, sitelink management system 140 may include document module 310 and sitelinks module 320. Depending on the implementation, one or more of modules 310-320 may be implemented as a combination of hardware and software based on the components illustrated and described with respect to FIG. 2. Alternatively, modules 310-320 may each be implemented as hardware based on the components illustrated and described with respect to FIG. 2.

Document module 310 may provide functionality with respect to documents and/or other types of data. For example, document module 310 may enable sitelink management system 140 to receive a request for sitelinks corresponding to a document. Document module 310 may also, or alternatively, enable sitelink management system 140 to identify hyperlinks within the document. As mentioned above, a document may include a web page or another type of network-accessible data structure that includes one or more hyperlinks.

Sitelink module 320 may provide functionality with respect to hyperlink, sitelinks and/or other types of data. For example, sitelink module 320 may enable sitelink management system 140 to determine a visual location of each hyperlink within a document. Sitelink module 320 may also, or alternatively, enable sitelink management system 140 to score hyperlinks based on the visual location corresponding to each hyperlink. Additionally, or alternatively, sitelink module 320 may enable sitelink management system 140 to communicate or otherwise provide (e.g., to search engine system 130) the sitelinks, corresponding to hyperlinks, according to the score corresponding to each hyperlink.

In addition to the functionality described above, the functional components of sitelink management system 140 may also, or alternatively, provide functionality as described elsewhere in this description. Further, while FIG. 3 shows a particular number and arrangement of modules, in alternative implementations, sitelink management system 140 may include additional modules, fewer modules, different modules, or differently arranged modules than those depicted.

Figure 4:
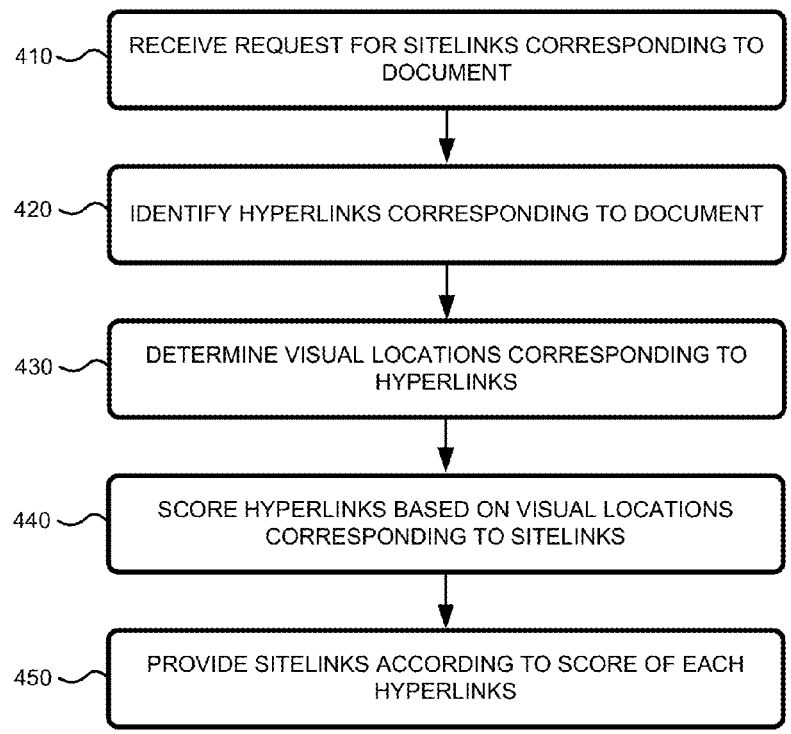
FIG. 4 is a diagram of an example process for providing sitelinks according to one or more implementations described herein.

FIG. 4 is a diagram of an example process 400 for providing sitelinks according to one or more implementations described herein. In one or more implementations, process 400 may be performed by one or more components of sitelink management system 140. In other implementations, some or all of process 400 may be performed by one or more other components/devices, or a group of components/devices, including or excluding sitelink management system 140. A description of FIG. 4 is provided below with reference to FIGS. 5-6.

As depicted, a request for sitelinks, corresponding to a document, is received (block 410). For example, sitelink management system 140 may receive a request for sitelinks corresponding to a document. The request may correspond to a scheduled request to process a document and/or a response to a new document being crawled. The request may originate from a user or operator of sitelink management system 140, client system 110, search engine system 130, or another type of system or device capable of communicating the request. Additionally, or alternatively, the request may be part of an automated process or application corresponding to executing a search engine query, a document indexing task, or another type of automated process.

Hyperlinks within the document are identified (block 420). For example, sitelink management system 140 may identify hyperlinks within the document. In one example, sitelink management system 140 may execute an operation, process, or application, such as a parse operation, process, or application to identify the sitelinks within the document and/or parse the document to locate tags (e.g., hyper text markup language (HTML) tags) corresponding to hyperlinks. In one possible implementation, sitelink management system 140 may analyze the parsed document with a pattern recognition (e.g., character recognition) operation, process, or application to identify the sitelinks within the document and/or the tags corresponding to hyperlinks.

Visual locations of the hyperlinks within the web page document are determined (block 430). For example, sitelink management system 140 may determine the visual location corresponding to each hyperlink within the document. As mentioned above, a visual location, as described herein, may include information describing a position of a hyperlink element within a DOM corresponding to a document, and/or information describing a position of the hyperlink when a document, that includes the hyperlink, is displayed within a web browser or another type of application.

The hyperlinks are scored based on the visual locations of the hyperlinks (block 440). For example, sitelink management system 140 may score the hyperlinks based on visual locations corresponding to the hyperlinks. In one example, sitelink management system 140 may score the hyperlinks based on one or more hyperlink analysis operations or processes executed by sitelink management system 140. For example, sitelink management system 140 may analyze the visual location of a hyperlink, as well as the visual location of other hyperlink within the document, to determine whether the hyperlink is positioned or arranged within the document in a manner that suggests that the hyperlink is a significant feature of the document.

Figure 5:
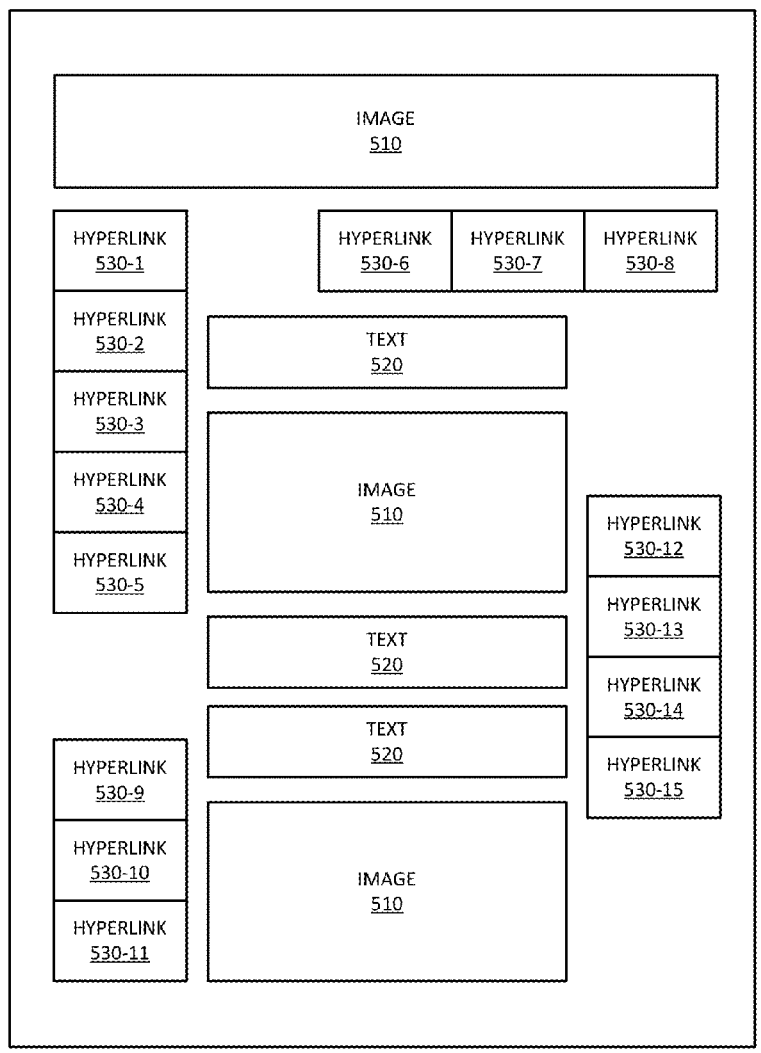
FIG. 5 is a diagram of an example document according to one or more implementations described herein.

FIG. 5 is a diagram of an example document 500 according to one or more implementations described herein. As depicted, document 500 may include images 510, text 520, and hyperlinks 530-1, 530-2, . . . , 530-15. While FIG. 5 shows a particular number and arrangement of features (e.g., images 510, text 520, and hyperlinks 530), in alternative implementations, an example document may include additional features, fewer features, different features, or differently arranged features than those depicted in FIG. 5.

As mentioned above, sitelink management system 140 may identify hyperlinks 530 within document 500, determine the visual locations of hyperlinks 530 within document 500, and score hyperlinks 530 based on visual locations corresponding to hyperlinks 530. In one example, sitelink management system 140 may score hyperlinks 530 by identifying different hyperlink groups within document 500 and identifying which hyperlink group seems to be the most significant with respect to document 500.

For instance, in example document 500, sitelink management system 140 may identify or otherwise define one hyperlink group as hyperlinks 530-1 through 530-5 since each of hyperlinks 530-1 and 530-5 appear in document 500 as a sequence of contiguous hyperlinks 530 (or hyperlinks 530 appearing together on an X-axis or a Y-axis). Sitelink management system 140 may identify another hyperlink group as hyperlinks 530-6 through 530-8 since hyperlinks 530-6 through 530-8 appear in document 500 as a sequence of continuous hyperlinks 530 (or hyperlinks 530 appearing together on an X-axis or a Y-axis). Sitelink management system 140 may identify another hyperlink group as hyperlinks 530-9 through 530-11, and another hyperlink group as hyperlinks 530-12 through 530-15, for similar reasons. Hyperlink management system 140 may determine that the hyperlink group corresponding to hyperlinks 530-1 through 530-5 is the most significant to document 500 since the hyperlink group corresponding to hyperlinks 530-1 through 530-5 includes the largest quantity hyperlinks 530 and/or appear closest to the top of document 500.

Additionally, or alternatively, sitelink management system 140 may determine the importance or significance of each hyperlink 530 within a hyperlink group. For example, referring to the hyperlink group that includes hyperlink 530-1 through hyperlink 530-5, sitelink management system 140 may determine that hyperlink 530-1 is the most significant of the hyperlink group because of the visual location of hyperlink 530-1. For similar reasons, sitelink management system 140 may determine that hyperlink 530-5 is the least significant of the hyperlink group. As such, sitelink management system 140 may score hyperlinks 530 based on a visual location corresponding to each hyperlink 530.

Figure 6:
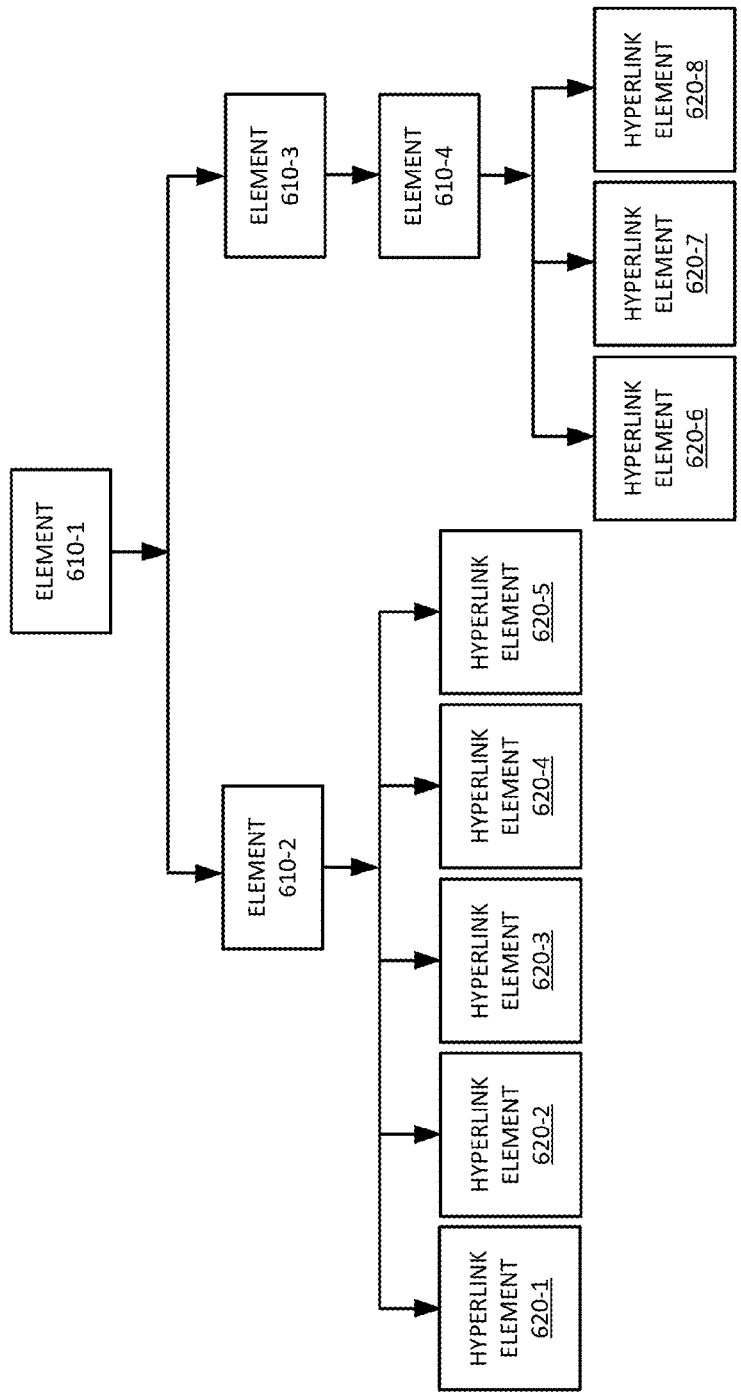
FIG. 6 is a diagram of an example document object model (DOM) according to one or more implementations described herein.

FIG. 6 is a diagram of an example of a DOM 600 according to one or more implementations described herein. As depicted in FIG. 6, DOM 600 may include elements 610-1 through 610-4 and hyperlink elements 620-1 through 620-8. Elements 610 may include any type of DOM element (e.g., a TITLE element, a HEADER element, etc.).

Hyperlink elements 620 may include DOM elements corresponding to one or more hyperlinks 530 of FIG. 5. For instance, hyperlink elements 620-1 through 620-5 may correspond to hyperlinks 530-1 through 530-5, respectively. However, for simplicity, only some of hyperlinks 530 are represented by hyperlink elements 620 in FIG. 6. In addition, while FIG. 6 shows a particular number and arrangement of DOM features (e.g., elements 610 and hyperlink elements 620), in alternative implementations, a DOM may include additional elements, fewer elements, different elements, or differently arranged elements than those depicted in FIG. 6.

As mentioned above, sitelink management system 140 may also, or alternatively, identify visual locations corresponding to hyperlinks within document 500 by obtaining software code corresponding to document 500 and using the software code to create DOM 600. Sitelink management system 140 may define the visual location of hyperlink 530 based on a position of a corresponding hyperlink element 620 in DOM 600. For instance, sitelink management system 140 may identify an X-coordinate and/or a Y-coordinate corresponding to each hyperlink element 620 and use the X-coordinate and/or Y-coordinate to identify or define visual locations, in addition to scoring one or more hyperlinks 530 corresponding to hyperlink element 620.

Additionally, or alternatively, sitelink management system 140 may identify or define hyperlink groups based on two or more hyperlink elements 620 corresponding to the same X-coordinate or Y-coordinate. In addition, sitelink management system 140 may identify or define hyperlink groups based on an ancestor DOM element (e.g., a parent DOM element, a grandparent DOM element, etc.) corresponding to each hyperlink element 620. For instance, if hyperlink element 620-1 through hyperlink element 620-8 were all positioned along the same X-coordinate or Y-coordinate, sitelink management system 140 may determine, based on ancestor DOM elements 610-2 and 610-4, that hyperlink elements 620-1 through 620-5 correspond to a different hyperlink group than hyperlink elements 620-6 through 620-8. Ancestor DOM elements may also, or alternatively, be used to infer the manner and/or general location that one or more hyperlinks 530 may be presented when document 500 is displayed in a web browser. Accordingly, sitelink management system 140 may use DOM technologies to identify visual locations corresponding to hyperlinks 530 and/or score hyperlinks 530 based on the visual locations, which may include identifying hyperlink groups, scoring hyperlink groups, etc.

Returning now to FIG. 4, process 400 may include providing sitelinks, corresponding to hyperlinks 530, according to the score of each hyperlink 530 (block 450). For example, sitelink management system 140 may provide sitelinks, corresponding to hyperlinks 530, according to the score of each hyperlink 530. In some implementations, providing sitelinks may include sitelink management system 140 storing the sitelinks for later use, Additionally, or alternatively, sitelink management system 140 may provide sitelinks to search engine system 130 so that, for example, search engine system 130 may include one or more of the sitelinks in a search result document that provides search engine results. In some implementations, sitelink management system 140 may provide the sitelinks in accordance with one or more rules or instructions, such as a limit to the quantity of sitelinks that may be provided, a constraint on the types of sitelinks that may be provided (e.g., sitelinks that do not exceed a particular length), etc.

While FIG. 4 shows a flowchart diagram of an example process 400 for providing sitelinks based on visual location, in other implementations, a process for providing sitelinks may include fewer operations, different operations, differently arranged operations, or additional operations than depicted in FIG. 4.

For example, the visual location of a hyperlink may be one factor of several factors used to score the hyperlink. An example of another factor may include a click-through rate corresponding to the hyperlink. In addition, in some implementations, one type of factor may be given more consideration than another type factor. For instance, a click-through rate corresponding to a particular hyperlink may have a greater impact on scoring the hyperlink than other factors.

Figure 7:
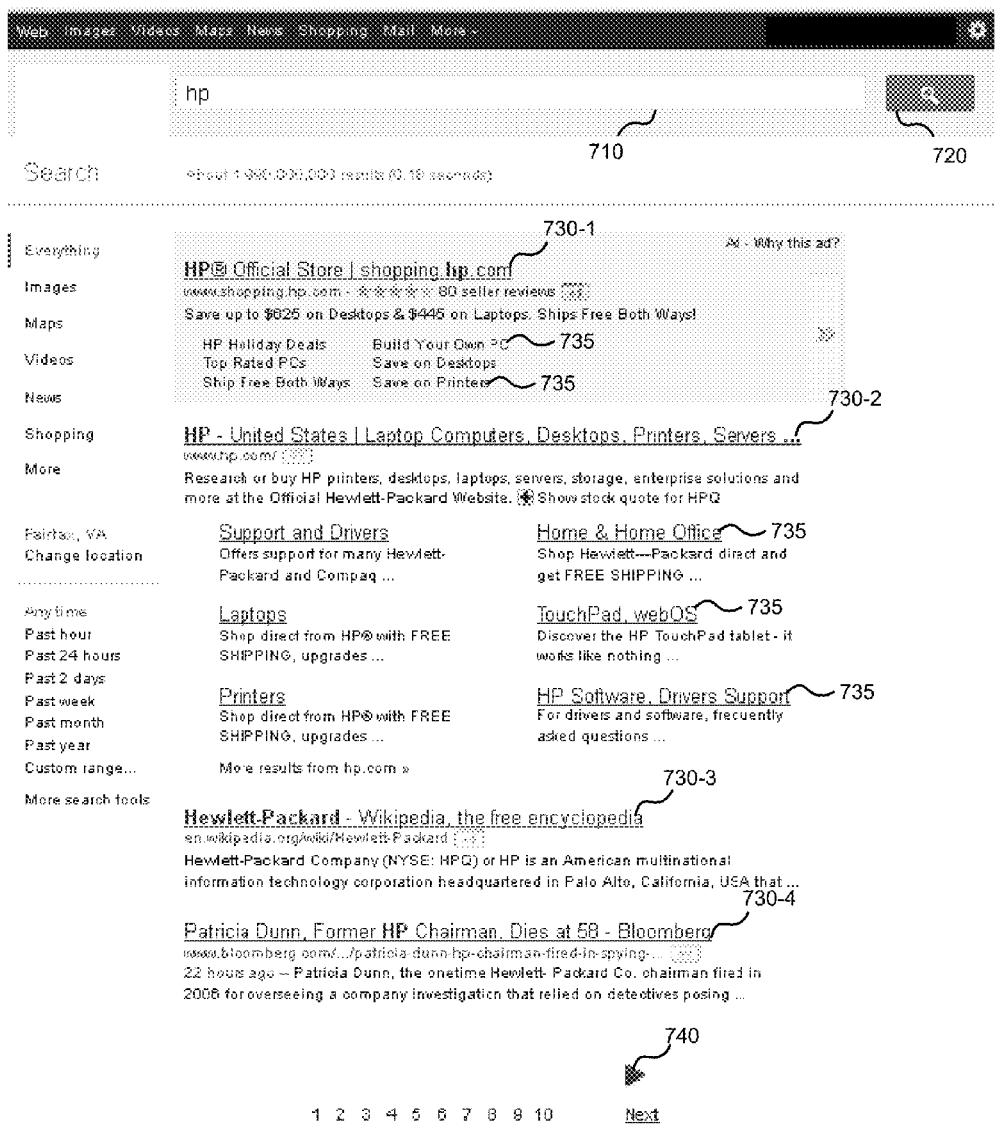
FIG. 7 is a diagram of an example search result document according to one or more implementations described herein.

FIG. 7 is a diagram of an example search result document 700 according to one or more implementations described herein. As depicted, search result document 700 may include a search parameters text box 710, a search command button 720, search engine results 730, and a document navigation tool 740. While FIG. 7 shows a particular number and arrangement of document objects (e.g., search parameters text box 710, search command button 720, search engine results 730, and document navigation tool 740), in alternative implementations, search result document 700 may include additional document objects, fewer document objects, different document objects, or differently arranged document objects than those depicted.

Search parameters text box 710 may provide a location for a user to input one or more search parameters (e.g., a letter, a number, a symbol, etc.), and search command button 720 may enable the user to cause a search query to be executed, based on the one or more search parameters, and search engine results 730 to be provided that are relevant to the one or more search parameters. Since search queries resulting in a large quantity of search engine results 730 may cause search engine results 730 to be displayed in multiple search result documents 700, document navigation tool 740 may enable the user to navigate between the search result documents 700 containing search engine results 730.

As depicted in FIG. 7, search engine results 730 may include one or more of a variety of information. For example, search engine results 730-1, 730-2, 730-3, and 730-4 each include a document title (which may also be a hyperlink to a corresponding document 500), a document description, and/or a document address, such as a uniform resource locator (URL). In addition, search engine results 730-1 and 730-2 each include sitelinks 735, which may corresponds to high-score hyperlinks 530 of document 500. As such, sitelink management system 140 may identify hyperlinks 530 within document 500 of FIG. 5, determine a visual location of hyperlinks 530 within document 500, score sitelinks 530 based on the visual locations of hyperlinks 530, and provide, cause, or otherwise enable sitelinks 530 to be provided in accordance with the score of each hyperlink 530. Providing sitelinks 735 based on the score of corresponding hyperlinks 530 may help ensure that the most significant hyperlinks 530 of document 500 are included in a search result that corresponds to document 500.

Figure 8:
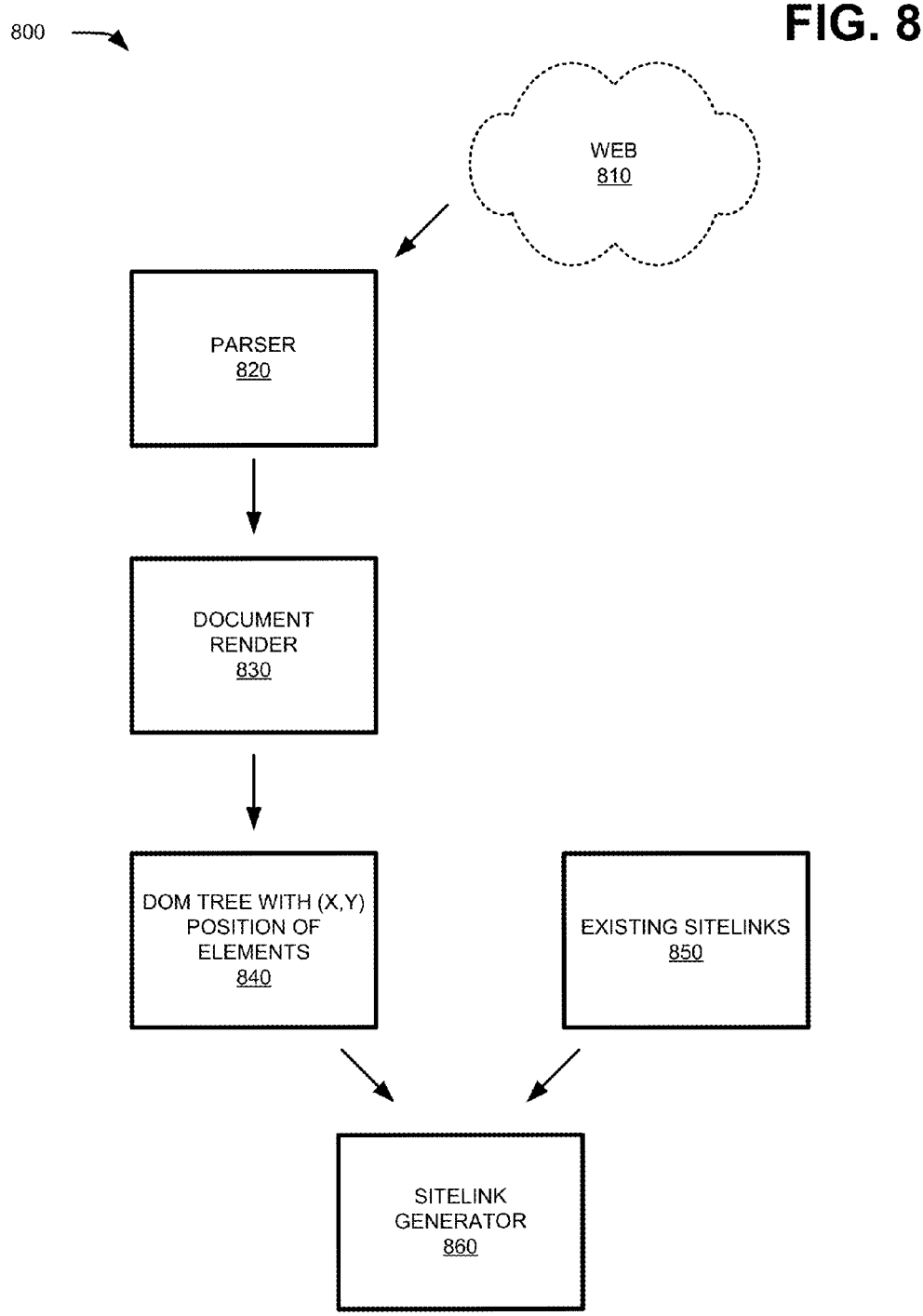
FIG. 8 is a diagram of example functional components of the sitelink management system according to one or more implementations described herein.

FIG. 8 is a diagram of example functional components of sitelink management system 140 according to one or more implementations described herein. As depicted in FIG. 8, sitelink management system 140 may be associated with a web 810 and may include a parser 820, a document renderer 830, a DOM tree 840, existing sitelinks 850, and a sitelink generator 860. Web 810 may correspond to network 120 (e.g., the Internet). Existing sitelinks 850 may be provided by search engine system 130 and/or sitelink management system 140.

Parser 820 may enable sitelink management system 140 to access a particular document (e.g., document 500) via web 810 and/or scan (e.g., "parse") the document 500 to identify hyperlinks within the document. In scenarios where a copy of the document is available in a data repository, sitelink management system 140 may also, or alternatively, identify hyperlinks within the document based on the copy of the document (e.g., without the parser functionality). As such, sitelink management system 140 may be capable of identifying sitelinks within a document in one or more ways.

Document renderer 830 may enable sitelink management system 140 to render the document in a browser application. The browser application may be capable of computing or otherwise creating DOM tree 840 corresponding to the document, where DOM tree nodes correspond to hyperlinks and include coordinates identifying a visual location (e.g., an X coordinate and a Y coordinate) corresponding to each hyperlink. The browser application may or may not be a browser application with a user interface component. Accordingly, sitelink management system 140 may be capable of implementing browser applications and/or DOM trees to determine visual locations corresponding to hyperlinks within a document.

Sitelink generator 860 may enable sitelink management system 140 to score sitelinks 530 based on a visual location corresponding to each hyperlink 530. As discussed above, this may include, for example, identifying hyperlink groups, determining a group score corresponding to each hyperlink group, and/or determining a hyperlink score corresponding to each hyperlink 530 (e.g., each hyperlink 530 in a hyperlink group). A group score and/or a hyperlink score may be determined in one or more of a variety of ways. For instance, as discussed above, a group score may be determined based on a quantity of hyperlinks 530 corresponding to a particular hyperlink group, relative to a quantity of hyperlinks 530 corresponding to another hyperlink group within document 500. A hyperlink score may be determined based on, for example, a visual location corresponding to a particular hyperlink 530 relative to the visual locations corresponding to one or more other hyperlinks 530 within document 500. In one example, once sitelink management system 140 identifies a particular hyperlink group as have a higher score than another hyperlink group, sitelink management system 140 may disregard one or more hyperlinks 530 corresponding to the lower-score hyperlink group.

As depicted in FIG. 8, the document may already be associated with existing sitelinks 850. In such scenarios, sitelink management system 140 may determine whether existing sitelinks 850 are consistent with the hyperlinks identified and scored by sitelink management system 140. In some implementations, existing sitelinks 850 that are not consistent with hyperlinks 530 identified and scored by sitelink management system 140 may be deleted, disassociated from the document, or otherwise handled so that the inconsistent sitelinks are not displayed in a corresponding search engine result 730 or do not take score over the sitelinks identified and scored by sitelink management system 140.

In addition to the functionality described above, the functional components of sitelink management system 140 may also, or alternatively, provide functionality as described elsewhere in this description. Further, while FIG. 8 shows a particular number and arrangement of functional components, in alternative implementations, sitelink management system 140 may include additional functional components, fewer functional components, different functional components, or differently arranged functional components than those depicted.

In some implementations, one or more of the outputs discussed above may be stored at any point during the overall sitelink scoring/management process. For instance, a DOM tree, rendered document, pared output, etc., may be stored by sitelink management system 140 and/or by another system.

Accordingly, systems and devices, described herein, may be used to enhance the information provided in search engine results. For example, sitelink management system 140 may receive a request for sitelinks corresponding to a document. Sitelink management system 140 may scan the document to identify hyperlinks included within the document and determine visual locations corresponding the hyperlinks within the document. Sitelink management system 140 may score the hyperlinks based on the visual location corresponding to each of the hyperlinks and provide sitelinks, corresponding to the hyperlinks, in accordance with the score of each hyperlink. Scoring hyperlinks according to visual location and providing sitelinks according to the score of corresponding hyperlinks may enable a search engine result to not only include hyperlinks to documents, but also to include the most visually significant sitelinks within the document. Accordingly, systems and devices, as described herein, may be used to enhance search engine results by including scored sitelinks in search engine results.

The foregoing description of implementations provides illustration and description, but is not intended to be exhaustive or to limit the implementations to the precise form disclosed. Modifications and variations are possible in light of the above disclosure or may be acquired from practice of the implementations.

For example, while a series of blocks has been described with regard to FIG. 4, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a field-programmable gate array (FPGA), or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computing device, the method comprising:
   receiving, by the computing device, a request for sitelinks corresponding to a document;
   identifying, by the computing device, a plurality of hyperlinks corresponding to the document,
      each hyperlink, of the plurality of hyperlinks, comprising a hyperlink object within the document;
   determining, by the computing device, a visual location corresponding to each hyperlink of the plurality of hyperlinks corresponding to the document;
   assigning, by the computing device, a score to each hyperlink, of one or more of the plurality of hyperlinks, based on the visual location corresponding to the hyperlink,
      assigning the score to each hyperlink of the one or more of the plurality of hyperlinks including:
         assigning a score to each hyperlink corresponding to a particular hyperlink group,
            each hyperlink, not corresponding to the particular hyperlink group, being disregarded,
            the particular hyperlink group including at least one hyperlink of the plurality of hyperlinks; and
   providing, by the computing device, at least one sitelink, corresponding to a hyperlink of the one or more of the plurality of hyperlinks, based on the score assigned to the hyperlink.

2. The method of claim 1, where identifying the plurality of hyperlinks corresponding to the document comprises:
   identifying the document based on the request; and parsing the document to identify hyperlinks within the document.

3. The method of claim 1, where determining the visual location corresponding to each hyperlink of the plurality of hyperlinks comprises:
obtaining software code corresponding to the document,
creating a document object model based on the software code,
where the document object model comprises a hyperlink element corresponding to each hyperlink of the plurality of hyperlinks, and
identifying the visual location corresponding to each hyperlink, of the plurality of hyperlinks, based on a position of each hyperlink element within the document object model.

4. The method of claim 3, where identifying the visual location corresponding to each hyperlink, of the plurality of hyperlinks, based on the position of each hyperlink element, comprises:
determining at least one coordinate corresponding to each hyperlink, of the plurality of hyperlinks, within the document object model, and
using the at least one coordinate to define the visual location.

5. The method of claim 1, where assigning the score to each hyperlink, of the one or more of the plurality of hyperlinks, based on the visual location corresponding to the hyperlink, comprises:
defining two or more hyperlink groups based on the visual location corresponding to each hyperlink of the plurality of hyperlinks,
the two or more hyperlink groups including the particular hyperlink group,
where each hyperlink group of the two or more hyperlink groups comprises at least one hyperlink of the plurality of hyperlinks,
identifying a quantity of hyperlinks corresponding to each of the two or more hyperlink groups, and
assigning a score to each hyperlink group of the two or more hyperlink groups based on the quantity of hyperlinks corresponding to each of the two or more hyperlink groups,
the particular hyperlink group being assigned a highest score out of the score assigned to each hyperlink group of the two or more hyperlink groups.

6. The method of claim 5, where each hyperlink group, of the two or more hyperlink groups, is defined based on a position of each hyperlink element within a document object model, and a parent element associated with each hyperlink element within the document object model.

7. The method of claim 1, further comprising:
generating a search result corresponding to a search engine query,
where the search result comprises:
a hyperlink corresponding to the document, and
the at least one sitelink; and
providing the search result.

8. The method of claim 1, where assigning the score to each hyperlink, of the one or more of the plurality of hyperlinks, includes:
assigning the score to each hyperlink, of the one or more of the plurality of hyperlinks, further based on a click-through rate corresponding to each hyperlink of the one or more of the plurality of hyperlinks.

9. The method of claim 1, further comprising:
disassociating, from the document, one or more existing sitelinks that are associated with the document when the one or more existing sitelinks are not consistent with the one or more of the plurality of hyperlinks.

10. A system, comprising:
one or more memory devices to store instructions; and
one or more processors to execute the instructions to:
receive a request for sitelinks corresponding to a document,
identify a plurality of hyperlinks corresponding to the document,
each hyperlink, of the plurality of hyperlinks, comprising a hyperlink object within the document,
determine a visual location corresponding to each hyperlink of the plurality of hyperlinks corresponding to the document,
assign a score to each hyperlink, of one or more of the plurality of hyperlinks, based on the visual location corresponding to each hyperlink of the one or more of the plurality of hyperlinks,
when assigning the score to each hyperlink of the one or more of the plurality of hyperlinks, the one or more processors are to:
assign a score to each hyperlink corresponding to a particular hyperlink group,
each hyperlink, not corresponding to the particular hyperlink group, being disregarded,
the particular hyperlink group including least one hyperlink of the plurality of hyperlinks,
select at least one sitelink, corresponding to a hyperlink, of the one or more of the plurality of hyperlinks, based on the score assigned to the hyperlink, and
provide a search result based on the at least one sitelink.

11. The system of claim 10, where, when identifying the one or more sitelinks corresponding to the document, the one or more processors are to:
identify the document based on the request; and
parse the document to identify hyperlinks within the document.

12. The system of claim 10, where, when determining the visual location corresponding to each hyperlink, the one or more processors are to:
obtain software code corresponding to the document,
create a document object model based on the software code,
where the document object model comprises a hyperlink element corresponding to each hyperlink of the plurality of hyperlinks, and
identify the visual location corresponding to each hyperlink, of the plurality of hyperlinks, based on a position of each hyperlink element within the document object model.

13. The system of claim 12, where, when identifying the visual location of each hyperlink based on a position of each hyperlink element within the document object model, the one or more processors are to:
determine at least one coordinate corresponding to each hyperlink element within the document object model, and
use the at least one coordinate to define the visual location.

14. The system of claim 10, where, when assigning the score to each hyperlink based on the visual location corresponding to each hyperlink, the one or more processors are to:
define two or more hyperlink groups based on the visual location corresponding to each hyperlink of the plurality of hyperlinks,
the two or more hyperlink groups including the particular hyperlink group, where each hyperlink group of the two or more hyperlink groups comprises at least one hyperlink of the plurality of hyperlinks,
identify the quantity of hyperlinks corresponding to each of the two or more hyperlink groups, and
score each hyperlink group, of the two or more hyperlink groups, based on the quantity of hyperlinks corresponding to each of the two or more hyperlink groups,
a score of the particular hyperlink group being highest out of a score of each hyperlink group of the two or more hyperlink groups.

15. The system of claim 14, where each hyperlink group, of the two or more hyperlink groups, is defined based on a position of each hyperlink within a document object model, and one or more parent elements associated with each sitelink within the document object model.

16. The system of claim 10, where, providing the search result, the one or more processors are to:
generate the search result corresponding to a search engine query,
where the search result comprises:
a hyperlink corresponding to the document, and
the at least one sitelink.

17. The system of claim 10, where, when assigning the score to each hyperlink, of the one or more of the plurality of hyperlinks, the one or more processors are further to:
assign the score to each hyperlink, of the one or more of the plurality of hyperlinks, further based on a click-through rate corresponding to each hyperlink of the one or more of the plurality of hyperlinks.

18. The system of claim 10, where the processor is further to:
delete one or more existing sitelinks, that are associated with the document, when the one or more existing sitelinks are not consistent with the one or more of the plurality of hyperlinks.

19. A non-transitory computer-readable medium storing instructions, the instructions comprising:
one or more instructions which, when executed by one or more processors, cause the one or more processors to:
receive a request for sitelinks corresponding to a document,
identify a plurality of hyperlinks corresponding to the document,
each hyperlink, of the plurality of hyperlinks, comprising a hyperlink object within the document,
produce a document object model associated with the document,
the document object model a hyperlink element corresponding to each hyperlink of the plurality of hyperlinks,
identify a visual location corresponding to each hyperlink, of the plurality of hyperlinks, based on a position of each hyperlink element within the document object model,
assign a score to each hyperlink, of one or more of the plurality of hyperlinks, based on the visual location corresponding to each hyperlink of the one or more of the plurality of hyperlinks,
the one or more instructions to assign the score to each hyperlink, of the one or more of the plurality of hyperlinks, including:
one or more instructions to assign a score to each hyperlink corresponding to a particular hyperlink group,
each hyperlink, not corresponding to the particular hyperlink group, being disregarded,
the particular hyperlink group including at least one hyperlink of the plurality of hyperlinks, and
provide at least one sitelink, corresponding to a hyperlink of the one or more of the plurality of hyperlinks, based on a score associated with the hyperlink.

20. The non-transitory computer-readable medium of claim 19, where the one or more instructions to identify the plurality of hyperlinks corresponding to the document include one or more instructions to cause the one or more processors to:
identify the document based on the request; and
parse the document to identify hyperlinks within the document.

21. The non-transitory computer-readable medium of claim 19, where the one or more instructions to identify the visual location of each hyperlink based on a position of each hyperlink element within the document object model include one or more instructions to cause the one or more processors to:
determine at least one coordinate corresponding to each hyperlink element within the document object model, and
use the at least one coordinate to define the visual location.

22. The non-transitory computer-readable medium of claim 19, where the one or more instructions to assign the score to each hyperlink of the one or more of the plurality of hyperlinks include one or more instructions to cause the one or more processors to:
define two or more hyperlink groups based on the visual location corresponding to each hyperlink of the plurality of hyperlinks,
the two or more hyperlink groups including the particular hyperlink group,
where each hyperlink group of the two or more hyperlink groups comprises at least one hyperlink of the plurality of hyperlinks,
identify a quantity of hyperlinks corresponding to each of the two or more hyperlink groups, and
assign a score to each hyperlink group, of the two or more hyperlink groups, based on the quantity of hyperlinks corresponding to each of the two or more hyperlink groups,
the particular hyperlink group being assigned a highest score out of the score assigned to each hyperlink group of the two or more hyperlink groups.

23. The non-transitory computer-readable medium of claim 22, where each hyperlink group, of the two or more hyperlink groups, is defined based on a position of each hyperlink within the document object model, and one or more parent elements associated with each hyperlink within the document object model.

24. The non-transitory computer-readable medium of claim 19, where the one or more instructions to provide the at least one sitelink include one or more instructions to cause the one or more processors to:
generate a search result corresponding to a search engine query,
where the search result comprises:
a hyperlink corresponding to the document, and
the at least one sitelink.

25. The non-transitory computer-readable medium of claim 19, where the one or more instructions to assign the score to each hyperlink, of the one or more of the plurality of hyperlinks, include one or more instructions to cause the one or more processors to:
assign the score to each hyperlink, of the one or more of the plurality of hyperlinks, further based on a click-through rate corresponding to each hyperlink of the one or more of the plurality of hyperlinks.

26. The non-transitory computer-readable medium of claim 19, the instructions further comprising one or more instructions to:

disassociate, from the document, one or more existing sitelinks that are associated with the document when the one or more existing sitelinks are not consistent with the one or more of the plurality of hyperlinks.

* * * * *

UNITED STATES PATENT AND TRADEMARK OFFICE
CERTIFICATE OF CORRECTION

| | | |
|---|---|---|
| PATENT NO. | : 9,053,177 B1 | Page 1 of 1 |
| APPLICATION NO. | : 13/493096 | |
| DATED | : June 9, 2015 | |
| INVENTOR(S) | : Minkoo Seo | |

It is certified that error appears in the above-identified patent and that said Letters Patent is hereby corrected as shown below:

In the Claims

Please correct Claim 19 as follows:

Column 19, line 49, after "model" insert --comprising--.

Signed and Sealed this
Seventeenth Day of November, 2015

Michelle K. Lee
*Director of the United States Patent and Trademark Office*